Sept. 8, 1970

E. E. WEEKLEY 3,527,088

ENGINE TEST MOUNTINGS

Filed Aug. 15, 1968

INVENTOR
EDWARD E. WEEKLEY
BY
Denys Vander Sande
HIS ATTORNEY

Sept. 8, 1970     E. E. WEEKLEY     3,527,088

ENGINE TEST MOUNTINGS

Filed Aug. 15, 1968     4 Sheets-Sheet 3

INVENTOR
EDWARD E. WEEKLEY
BY
*Jerome Vander Sande*
HIS ATTORNEY

Sept. 8, 1970  E. E. WEEKLEY  3,527,088
ENGINE TEST MOUNTINGS

Filed Aug. 15, 1968  4 Sheets-Sheet 4

INVENTOR
EDWARD E. WEEKLEY
BY
HIS ATTORNEY

United States Patent Office 3,527,088
Patented Sept. 8, 1970

3,527,088
ENGINE TEST MOUNTINGS
Edward Elijah Weekley, Barry, Glamorgan, Wales, assignor to John Curran Limited, Cardiff, Wales, Great Britain, a British company
Filed Aug. 15, 1968, Ser. No. 753,013
Int. Cl. G01n 15/00
U.S. Cl. 73—117.4                                        6 Claims

ABSTRACT OF THE DISCLOSURE

A mounting for an engine under test, incorporating an engine thrust measuring device, and including an anti-friction support comprising two parallel flexible links each connected at one end to a stationary support and at the other end to a movable support for the engine, and each link having a central length located between two relatively rigid guides, and two flexible portions adjacent opposite ends of each link.

---

Figure 1:
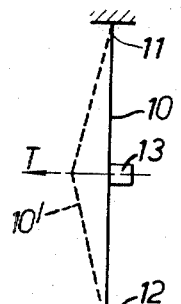

This invention relates to apparatus for supporting an engine for test purposes, and is particularly applicable to the testing of jet engines. During the testing of such engines it is usually required that the thrust exerted by the engine should be measured while the engine is under test and for this purpose it is known to mount the engine from or on a support in such a way that the engine is free to move within small limits in the direction of the thrust, and the thrust is then measured by a suitable thrust measuring instrument, for example a load cell or strain gauge.

The design of suitable supporting apparatus for engines under test presents various difficulties. It is essential that the supporting equipment should offer minimum resistance to movement over the whole range of thrust developed by the engine, in order that the thrust measurement should be accurate. It is also important that the hysteresis resistance should be as small as possible: this hysteresis appears as a difference between the thrust measurements corresponding to any particular true value of thrust depending upon whether the thrust has been increasing or decreasing at the instant of measurement. In many arrangements the supporting apparatus must normally be capable of supporting the complete weight of the engine and all the associated test equipment, which may amount to 50 tons or more. In addition the supporting apparatus is preferably so designed as to resist movements of the engine in any direction other than parallel to the line of thrust and should also be capable of absorbing the very high moments or torque couples resulting from lateral displacement between the supporting device and the line of thrust of the engine. It is normally not possible to place the supporting device accurately on the line of thrust.

It is known in such supporting apparatus to use a flexible metallic strap, the two opposite ends of which are anchored to one part such as a fixed support, while the centre of the strap is anchored to a moving part which may be connected to the engine. Such supporting systems act somewhat in the nature of diaphragms to permit movement of the engine in a direction perpendicular to the plane of the diaphragm or strap and to resist movement in all directions parallel to the plane of the diaphragm. It has been found however that such prior supporting systems, particularly when used for very heavy loads and high engine thrust values, do not satisfy the requirements for minimum resistance, accurate positioning, and minimum hysteresis. It is accordingly an object of the invention to provide an improved supporting apparatus which may be particularly suitable for heavy loads and thrust values, especially where the line of action of the thrust is spaced considerably from the supporting system.

The invention consists broadly in apparatus for supporting an engine for test purposes, comprising two relatively movable members, one constituting a staationary support and the other a movable support adapted to be connected to an engine, and connecting means acting between the movable members and comprising two parallel flexible link elements, each connected at opposite ends respectively to the two relatively movable members, and the arrangement being such that at least under certain test conditions one of said link elements is in tension, and the other link element is in compression, the link element subject to compression comprising a relatively stiff length located between two relatively flexible lengths, such that flexing of said link element is confined to said flexible lengths.

The arrangement may be such that under certain test conditions either of the link elements may be in compression and preferably each link element therefore comprises a relatively stiff length located between two relatively flexible lengths.

The apparatus will preferably include at least two sets of connecting means affording two pairs of parallel link elements. The two pairs of link elements thus act somewhat as a parallel motion linkage.

According to a preferred feature of the invention each link element subject to compression comprises a flexible element confined over part of its length between two relatively stiff guide elements. Thus conveniently the guide elements are positioned closely adjacent to said flexible element, but are arranged not to absorb any appreciable compression load. The guide elements may be loosely engaged with the flexible element.

According to another preferred feature of the invention the two link elements of a pair have approximately similar stress/strain characteristics. The two link elements may conveniently constitute parts of a common flexible member.

In any case the ends of each link element are positively and non-pivotally connected to the two relatively movable members.

In one preferred construction according to the invention the movable support is arranged to carry the whole static weight of the engine and associated equipment and there are provided flexible service, supply, and instrumentation connections for the engine under test, extending between said stationary and movable supports. The movable support may be provided with hoisting mechanism to raise the engine into position and with quick release connections for engagement with corresponding quick release members attached to the engine itself. All the necessary connections to the engine can thus be completed before the engine is moved into position on the test unit.

Figure 2:
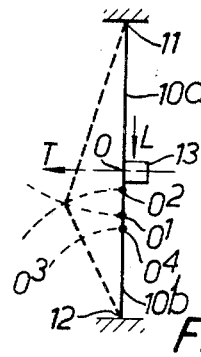
Figure 3:
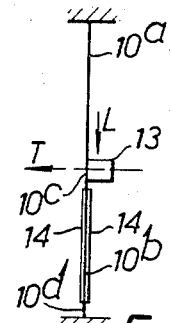
Figure 4:
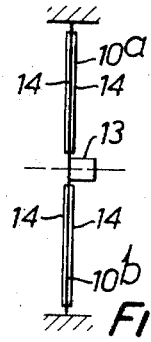
Figure 5:
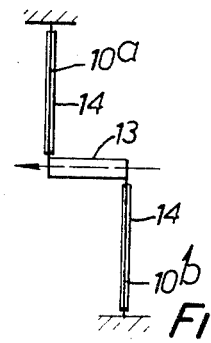
Figure 6:
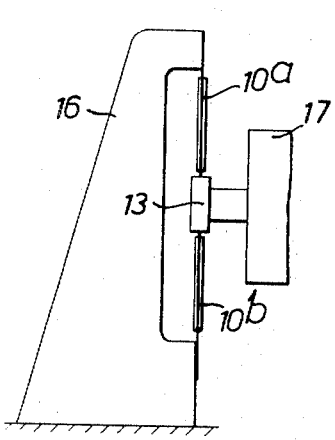
Figure 7:
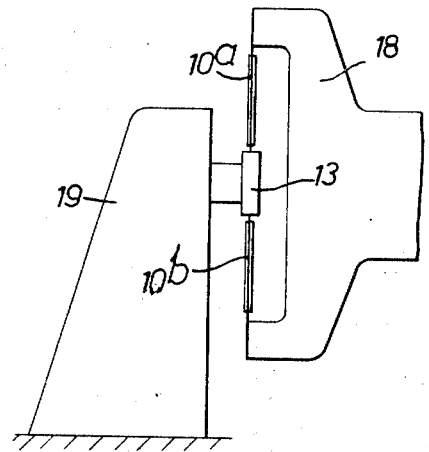
Figure 8:
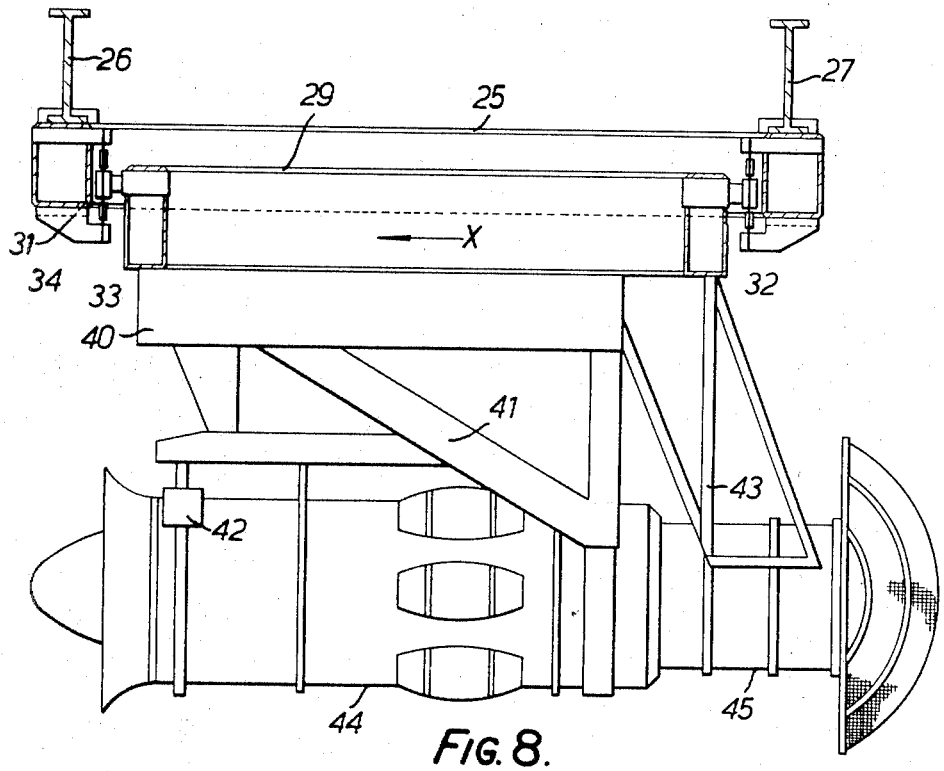
Figure 9:
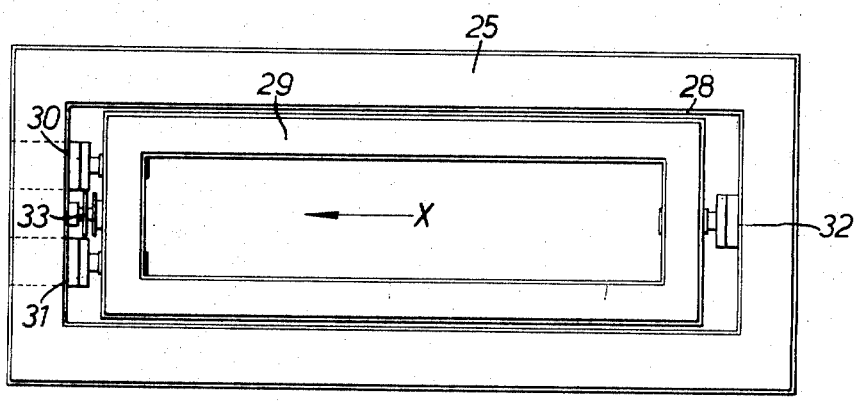
Figure 10:
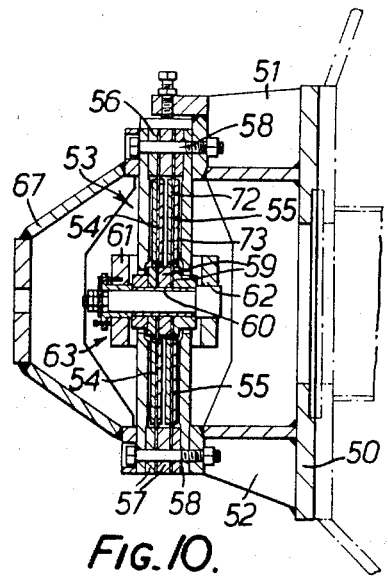
Figure 11:
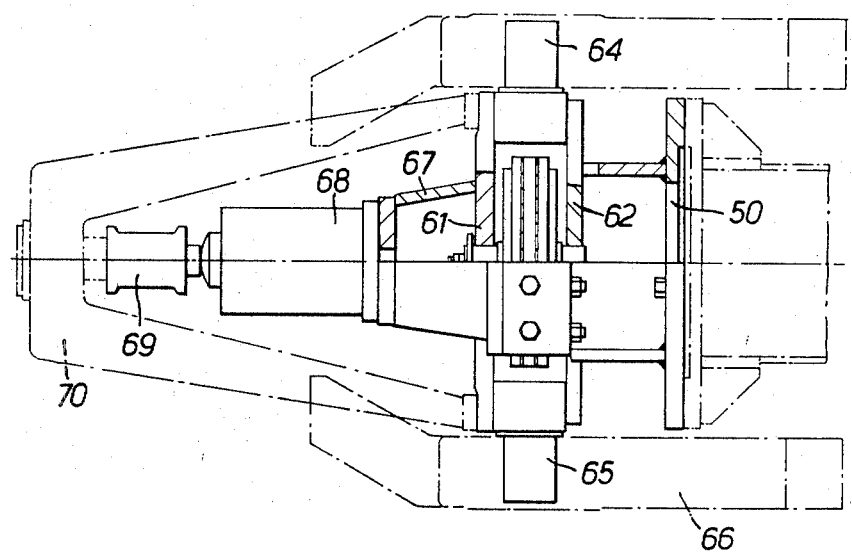
Figure 12:
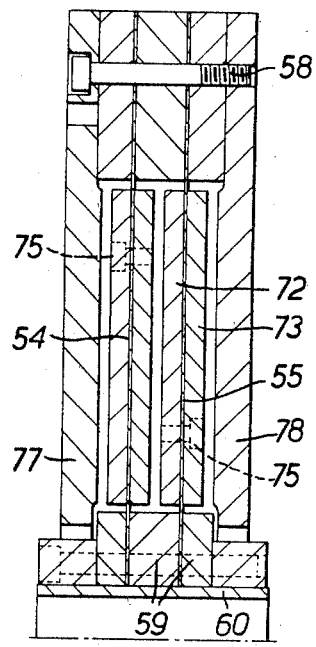
Figure 13:
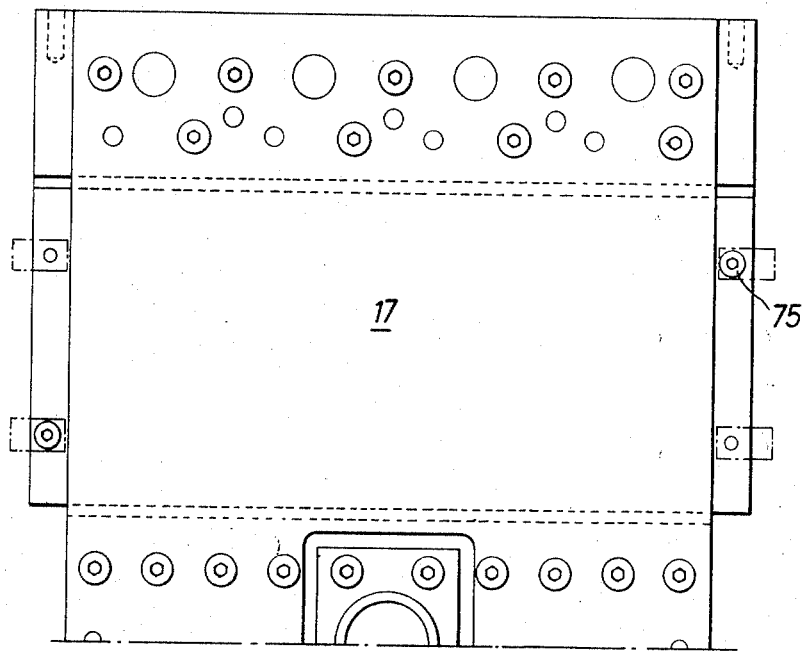

The invention may be performed in various ways and a number of different embodiments will now be described by way of example with reference to the accompanying drawings, in which FIG. 1 is a diagram illustrating the distortion of a simple metallic strap or diaphragm, FIG. 2 is a smilar diagram illustrating the distortion which occurs when a transverse load is applied, FIG. 3 illustrates the provision of a stiffening device for one side of the unit, in accordance with the invention, FIG. 4 illustrates stiffening units on both sides of the device, FIG. 5 illustrates an alternative supporting device with two link elements offset along the line of thrust, each with a stiffening device according to the invention, FIG. 6 is a diagram illustrating an embodiment of the invention similar in principle to that of FIG. 4, FIG. 7 is a view similar to FIG. 6 showing an inverted arrangement according to the invention, FIG. 8 is a somewhat diagrammatic side elevation partly in section showing a gas turbine jet engine mounted in position on a test unit having supporting device in accordance with the invention, FIG. 9 is a diagrammatic simplified plan view of the upper support member of the unit illustrated in FIG. 8, FIG. 10 is a sectional side elevation showing the detailed construction of one form of support unit according to the invention, FIG. 11 is a plan view of the unit of FIG. 10 partly broken away, FIG. 12 is a sectional view on a further enlarged scale showing the arrangement of the two pairs of stiffening members included in the construction of FIGS. 10 and 11, and FIG. 13 is an end view of the construction of FIG. 12.

Referring first to FIG. 1, there is shown a flexible metaillic strap 10 anchored at its ends 11, 12 and connected at a centre point to a member 13 movable in the direction of an applied thrust T perpendicular to the plane of the strap. This thrust may represent the thrust exerted by an engine under test. Under the influence of this applied thrust the strap will distort into the position illustrated at 10' and within small limits the resistance to movement is low and the device is capable of guiding the member 13 to move along the center line.

FIG. 2 illustrates a similar arrangement which is subject not only to an applied thrust T along the central axis but also is subject to an applied transverse load L which may represent the weight of the engine and other components. Considering the situation before the thrust T is applied, the transverse load L will cause an extension of the upper strap element 10a such that the lower end of this element, which is normally at the centre 0, extends to the position $0^1$. The load L also applies compression force to the lower strap element 10b and as a result of this compression the upper end of this strap element 10b tends to move downwards to a position $0^2$. The points $0^1$ and $0^2$ may or may not be coincident: in FIG. 2 the compression of the lower element 10b is shown as less than the extension of the upper element 10a and the point $0^2$ is therefore above $0^1$. Assuming now that a thrust T is applied to the member 13 the two strap elements 10a and 10b can be considered for simplicity as moving along the arcs of two circles which intersect at a point $0^3$. At this point the lengths of the two strap elements will be equal to their natural lengths under the applied transverse load L when the thrust T is zero. In theory therefore this arrangement can provide a type of bi-stable support giving low resistance to movement in the direction of the thrust T within small displacement values. In practice however the situation is more complicated. The lower strap element 10b, when subject to compression, will tend to flex or buckle slightly and as a result its length will tend to shorten by a greater amount than the extension of the upper strap element 10a. The upper end of this lower element 10b may thus tend to move to a point $0^4$ which is below rather than above the point $0^1$. When a thrust T is applied the point $0^4$ moving on the arc or a circle tends to diverge and separate from the point $0^1$ so that the two elements 10a and 10b tend to apply tensile forces to each other. The supporting device may as a result become seriously asymmetric, and will no longer function satisfactorily to support the load with minimum resistance to movement in the direction of the thrust T.

The invention is based on the discovery that the operation of such a support can be surprisingly improved by arranging that the flexible element which is subject to compression is stiffened so as to prevent or minimise any flexing or buckling, at least over the major part of its length. FIG. 3 illustrates diagrammatically a simplified form of the invention similar to the device illustrated in FIGS. 1 and 2 but in which the lower link element 10b is provided with a stiffening structure 14 extending over the greater part of its length but leaving two short unsupported flexible elements 10c, 10d at its top and bottom ends. With this arrangement any tendency for the lower element 10b to buckle is minimised and although this element can still flex at both ends to allow the member 13 to move freely in the direction of the thrust T the upper end of this lower element 10b will not collapse downwardly under the load L to the same extent as in FIG. 2. The stiffening structure 14 preferably is formed as a separate guide non-rigidly connected to the element 10b so as not to share the compressive force applied to the element 10b.

In many arrangements the device is liable under different test conditions to experience compressive forces in either of the two link elements 10a or 10b. FIG. 4 illustrates diagrammatically a preferred form of the invention in which both these elements 10a, 10b are provided with stiffening guide structures 14. FIG. 5 illustrates a modification in which the two elements 10a, 10b are offset in a direction of the applied thrust T, each of these elements again being provided with a stiffening structure 14.

FIG. 6 illustrates diagrammatically an arrangement based on the structure of FIG. 4 in which the opposite remote ends of the link elements 10a, 10b are connected to a common anchorage member 16 which may be the stationary support, while the central movable member 13 is attached to a part 17 which may be the movable carrier for the engine under test. In the construction of FIG. 7 the arrangement is reversed with the two opposite ends of the link elements 10a, 10b connected to a common member 18 which constitutes the engine carrier, while the central member 13 is rigidly connected to a fixed anchorage 19.

In the engine testing apparatus illustrated in FIGS. 8 and 9 the stationary support member comprises a hollow rigid box frame 25 rigidly supported from two overhead joists 26, 27 and having a central rectangular opening 28 in which is movably mounted a rectangular movable support 29. This movable support is connected to the stationary box frame 25 by means of three supporting units each of the type illustrated diagrammatically in FIG. 4 above. Two of these units 30, 31 are mounted side by side at one end of the apparatus and a third unit 32 is mounted at the other end, thus providing three suspension points which ensure that the movable support 29 remains horizontal in both transverse directions but is free to move longitudinally within limits in the direction of the arrow X. A load cell or strain gauge 33 is connected between an end of the movable member 29 and a stationary abutment 34 and this provides an indication of any thrust exerted in the direction of the arrow X.

The movable support member 29 is detachably connected to an engine carrier member 40 having frame members 41, 42, 43 and releasable locking devices (not shown) for supporting a gas turbine jet engine 44 with a tail pipe 45. The framework and the releasable locking devices may be of conventional design and will not be described in detail. Conveniently the carrier member 40 is provided with quick release couplings (not shown) for engagement with corresponding couplings in the movable support 29 whereby all the engine service supply and testing connections can be effected rapidly when the carrier 40, with the engine attached, is lifted into position. The detailed operation of connecting all service lines to individual components on the engine can be completed elsewhere before the carrier 40 and the engine are brought into position for a test. Flexible service connections and instrumentation lines, such as fuel lines, lubricating lines, electrical power supply and instrument connections are provided by flexible members (not shown) interconnecting the members 25 and 29.

FIGS. 10 and 11 illustrate one form of supporting unit in accordance with the invention which may be employed in an engine test apparatus as illustrated in FIG. 8 or 9 or in various other forms of engine testing equipment. Normally three or four such units would be provided at spaced support points around the engine carrier member, but one unit only is illustrated in detail. The engine carrier member is rigidly secured to a frame 50 having two rigid lugs 51, 52, which carry a self-contained supporting unit illustrated generally at 53. This unit comprises two thin flexible metallic straps 54, 55 arranged parallel with one another with their opposite ends clamped and anchored between a series of spacer blocks 56, 57, these spacer blocks and the metallic straps having apertures to receive clamping bolts 58 by which they are secured respectively to the two lugs 51, 52. The central parts of each of the two flexible straps 54, 55 are clamped between pairs of rigid plates 59, these plates and the metallic straps being apertured to receive a hollow tubular sleeve 60. The opposite ends of this sleeve 60 are connected to spigots engaged in apertures in two transverse bearing plates 61, 62 and adjusting means 63 are provided for positioning the sleeve lengthwise relative to these bearer plates. The bear plates 61, 62 extend horizontally and are connected at their opposite ends to trunnions 64, 65 (see FIG. 11), each mounted in linear bearings (not shown) in a stationary support frame 66. Any vertical load from the engine carrier frame 50 will thus be applied through the flexible straps 54, 55, to the transverse bearer plates 61, 62 and thence through the trunnions 64, 65 to the stationary base frame 66. The linear bearings on the trunnions allow relative lateral movement resulting from thermal expansion.

Endwise movement of the engine carrier, parallel to the direction of thrust of the engine, that is to say in a left-to-right or right-to-left direction in FIG. 10, will be accommodated with minimum resistance and in order to measure the thrust a conical frame member 67 is rigidly secured, via the spacer members 56, 57, to the two lugs 51, 52, and a load cell 68 is positioned between this member 67 and an anvil 69 carried by a rigid yoke 70 attached to the stationary base member 66.

Each of the metallic straps 54, 55 is clamped and anchored at its two opposite ends, as described above, and at its centre point. The length of each strap between the central spacer members 59 and the outer spacer members 56 and 57, is surrounded by a stiffening structure comprising two parallel stiffening plates 72, 73 extending lengthwise over the greater part of the respective free length of the metallic strap but stopping short of the adjacent spacer members to provide small unsupported strap lengths where the strap can flex. This arrangement thus corresponds to the construction illustrated diagrammatically in FIG. 4 but with two strap members arranged side by side, each provided with individual stiffening support structures.

FIGS. 12 and 13 illustrate on a larger scale one half of the supporting unit 53 shown in FIGS. 10 and 11. As shown each of the stiffening plates 72, 73 is of generally rectangular shape as seen in the direction of thrust, and the two plates of each pair are non-positively connected to the respective strap by means of bolts 75 arranged to connect the two plates of a pair at points beyond the edges of the respective strap. The bolts are preferably tightened sufficiently for the two plates to grip loosely against the opposite faces of each strap but not to such an extent as to exert appreciable frictional grip such as might result in a part of the compressive or tensile loading on the strap being shared by the two plates 72, 73.

Each of the supporting units 53 also includes two end cover plates 77, 78 bolted to the end spacer members 56, 57 and having central aperatures through which freely passes the hollow sleeve 60. These end plates 77, 78 act as protective covers for the unit and also as rigid locating stops to limit the possible relative movement between the engine carrier 50 and the stationary base frame 66 if for example the metallic straps 54, 55 should break.

In this particular example each of the straps 54, 55 is of 16 gauge steel sheet having a thickness of approximately 0.064" and a total length from top to bottom of approximately 30". The unit is designed to accommodate deflections under the thrust of the engine of up to approximately 0.02", but deflection of up to about 0.1" may be obtainable in accordance with the invention without unduly increasing the resistance of the support system.

In the case where an engine is arranged to exert a thrust in different directions, for example, when an engine is arranged to power an aircraft arranged to be driven vertically, forwards and backwards and laterally, the engine carrier may be carried by a support which is itself bodily movable on a further support while the further support is bodily movable on a third fixed support. The carrier is mounted on the first support by strap assemblies embodying the invention while the second support is similarly supported by the third support. The directions of movement of the carrier on the first support, of the first support on the second and the second support on the third correspond to the directions of flight. The various supports are preferably constrained to move in directions each at right angles to the others.

In a still further modification, the stiffening members may each be made a push or sliding fit on the strap, means being provided for locating the member at a desired position along the strap.

In the arrangements described the flexible strap elements are formed of flexible sheet metal. Other materials may be used provided that adequate strength and flexibility is provided. Rigid links may also be employed provided that proper flexibility is provided at the ends. Normal pivot bearings would not in general be satisfactory since at the loads contemplated such bearings would introduce friction and hysteresis errors. Flexible non-frictional connections of other types may however prove to be feasible, such as coiled springs, leaf springs, or elastomeric bushes arranged to distort angularly in shear.

I claim:

1. Apparatus for supporting an engine for test purposes, comprising two relatively movable members, one constituting a stationary support and the other a movable support adapted to be connected to an engine, and connecting means acting between the relatively movable members and comprising two parallel flexible link elements, each connected at opposite ends respectively to the two relatively movable members, and the arrangement being such that at least under certain test conditions one of the said link elements is in tension, and the other link element is in compression, and in which the link element subject to compression comprises a flexible element capable of flexing at its opposite ends but confined over part of its length between two relatively stiff guide elements, said guide elements being positioned closely adjacent to said flexible element, but arranged not to absorb any appreciable compression load, such that flexing of said link element is confined to flexible lengths.

2. Apparatus according to claim 1, in which the said guide elements are loosely engaged with the flexible element.

3. Apparatus according to claim 1, in which the two said link elements have approximately similar stress/strain characteristics.

4. Apparatus according to claim 1, in which the two said link elements constitute parts of a common flexible member.

5. Apparatus according to claim 1, in which each of said two link elements comprises a flexible element confined over part of its length between two relatively stiff guide elements, so as to be capable of limited lengthwise movement between said guide elements.

6. Apparatus according to claim 1, in which the two said link elements are arranged approximately in a common plane, the adjacent ends of the two link elements being connected to the same one of the two said relatively movable members, and the remote ends of the two link elements being connected to the other one of the two said relatively movable members.

References Cited

UNITED STATES PATENTS

| | | | |
|---|---|---|---|
| 2,790,322 | 4/1957 | Grimes et al. | 73—117.4 |
| 3,038,331 | 6/1962 | Henry et al. | |
| 3,122,917 | 3/1964 | Ormond | 73—117.4 |
| 3,201,980 | 8/1965 | Webb | 73—141 X |
| 3,210,991 | 10/1965 | Weekley | 73—117.4 |

JERRY W. MYRACLE, Primary Examiner